(12) United States Patent
Jackson et al.

(10) Patent No.: US 11,477,629 B2
(45) Date of Patent: *Oct. 18, 2022

(54) SYSTEMS AND METHODS FOR REMOTE MANAGEMENT OF EMERGENCY EQUIPMENT AND PERSONNEL

(71) Applicant: WHELEN ENGINEERING COMPANY, INC., Chester, CT (US)

(72) Inventors: Cole Jackson, Cheshire, CT (US); Kenneth Lemieux, Mystic, CT (US); Caleb Garrett, Essex, CT (US); Joseph Eduardo, Middletown, CT (US)

(73) Assignee: WHELEN ENGINEERING COMPANY, INC., Chester, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/108,179

(22) Filed: Dec. 1, 2020

(65) Prior Publication Data

US 2021/0084481 A1    Mar. 18, 2021

Related U.S. Application Data

(63) Continuation of application No. 15/958,550, filed on Apr. 20, 2018, now Pat. No. 10,887,747.

(51) Int. Cl.
*H04W 4/90* (2018.01)
*G07C 5/00* (2006.01)
(Continued)

(52) U.S. Cl.
CPC .............. *H04W 4/90* (2018.02); *G06F 16/29* (2019.01); *G07C 5/008* (2013.01); *G08G 1/0137* (2013.01); *G08G 1/16* (2013.01)

(58) Field of Classification Search
CPC .......... H04W 4/90; G06F 16/29; G07C 5/008; G08G 1/0137; G08G 1/16; G08B 27/005; G08B 27/001
See application file for complete search history.

(56) References Cited

U.S. PATENT DOCUMENTS

| 4,704,610 A | 11/1987 | Smith et al. |
| 6,028,514 A | 2/2000 | Lemelson et al. |

(Continued)

FOREIGN PATENT DOCUMENTS

| CA | 2215440 A1 | 3/1999 |
| CN | 104112348 A | 10/2014 |

(Continued)

OTHER PUBLICATIONS

Anzilotti, E., Can The Private Sector Help Cities Stop Traffic Deaths?, www.fastcompany.com, World Changing Ideas Newsletter, Jan. 2, 2018.

(Continued)

*Primary Examiner* — Julio R Perez

(74) *Attorney, Agent, or Firm* — Hogan Lovells US LLP

(57) ABSTRACT

The disclosure presents a system for remotely managing emergency equipment through wireless network and methods to use this system to monitor emergency equipment and deliver emergency information to subscribers. The system for remotely managing emergency equipment includes at least a node, also called as end user emergency equipment, a remote server, and a plurality of direct and indirect subscriber devices. The remote server receives data collected from each node, processes the node data, and sends the processed data to direct and indirect subscribers to manage emergency equipment. The system can improve the efficiency on collision avoidance, emergency warning, and emergency vehicle dispatch management.

19 Claims, 8 Drawing Sheets

(51) Int. Cl.
  *G08G 1/01*  (2006.01)
  *G06F 16/29* (2019.01)
  *G08G 1/16*  (2006.01)

(56) References Cited

U.S. PATENT DOCUMENTS

| | | | |
|---|---|---|---|
| 6,112,075 | A | 8/2000 | Weiser |
| 6,516,273 | B1 | 2/2003 | Pierowicz et al. |
| 6,700,504 | B1 | 3/2004 | Aslandogan et al. |
| 6,895,332 | B2 | 5/2005 | King et al. |
| 6,958,707 | B1 | 10/2005 | Siegel |
| 7,046,160 | B2 | 5/2006 | Pederson et al. |
| 7,085,637 | B2 | 8/2006 | Breed et al. |
| 7,271,736 | B2 | 9/2007 | Siegel et al. |
| 7,283,045 | B1 | 10/2007 | Manz |
| 7,480,514 | B2 | 1/2009 | Karaoguz et al. |
| 7,522,998 | B2 | 4/2009 | Hughes |
| 7,663,504 | B2 | 2/2010 | Votaw et al. |
| 7,868,783 | B2 | 1/2011 | Bachelder |
| 7,884,738 | B2 | 2/2011 | Pappas et al. |
| 7,899,621 | B2 | 3/2011 | Breed et al. |
| 8,094,040 | B1 | 1/2012 | Cornett et al. |
| 8,346,468 | B2 | 1/2013 | Emanuel et al. |
| 8,350,721 | B2 | 1/2013 | Carr |
| 8,487,780 | B2 | 7/2013 | Edwardson |
| 8,552,885 | B2 | 10/2013 | Rijks |
| 8,581,744 | B2 | 11/2013 | Myler |
| 8,593,301 | B2 | 11/2013 | Newman |
| 8,624,727 | B2 * | 1/2014 | Saigh .................. A61K 31/198 340/539.13 |
| 8,712,429 | B2 | 4/2014 | Nagorniak |
| 8,723,680 | B1 | 5/2014 | Baker |
| 8,823,548 | B2 | 9/2014 | Johnson et al. |
| 8,842,021 | B2 | 9/2014 | Behm et al. |
| 8,928,492 | B2 | 1/2015 | Boscacci |
| 8,935,036 | B1 | 1/2015 | Christensen et al. |
| 8,963,705 | B2 | 2/2015 | Miller et al. |
| 9,053,637 | B2 | 6/2015 | Mawbey et al. |
| 9,254,781 | B2 | 2/2016 | Applebaum |
| 9,278,689 | B1 | 3/2016 | Delp |
| 9,412,273 | B2 * | 8/2016 | Ricci .................. B60R 16/0373 |
| 9,547,986 | B1 | 1/2017 | Curlander et al. |
| 9,635,500 | B1 | 4/2017 | Becker et al. |
| 9,738,217 | B1 | 8/2017 | Bradley et al. |
| 9,742,709 | B1 | 8/2017 | Laich |
| 9,756,668 | B2 | 9/2017 | Farrell et al. |
| 9,762,470 | B2 | 9/2017 | Alam et al. |
| 9,786,154 | B1 | 10/2017 | Potter et al. |
| 9,805,430 | B2 | 10/2017 | Miasnik |
| 9,805,601 | B1 * | 10/2017 | Fields .................. B60T 17/22 |
| 9,843,913 | B2 | 12/2017 | Dahan et al. |
| 9,894,478 | B1 | 2/2018 | Deluca et al. |
| 10,127,813 | B2 | 11/2018 | Walsh et al. |
| 10,531,224 | B1 | 1/2020 | Lemieux |
| 10,559,208 | B1 | 2/2020 | McAlpine et al. |
| 10,689,815 | B2 | 6/2020 | Sheckler et al. |
| 2003/0137415 | A1 | 7/2003 | Thomson |
| 2003/0141990 | A1 | 7/2003 | Coon |
| 2003/0169181 | A1 | 9/2003 | Taylor |
| 2004/0246144 | A1 | 12/2004 | Siegel et al. |
| 2004/0263355 | A1 | 12/2004 | Carroll |
| 2005/0104745 | A1 * | 5/2005 | Bachelder ................ G08G 1/07 340/906 |
| 2006/0009234 | A1 | 1/2006 | Freer |
| 2006/0030984 | A1 * | 2/2006 | Kamiya .................. G08G 1/166 701/31.4 |
| 2007/0132608 | A1 | 6/2007 | Votaw et al. |
| 2007/0132609 | A1 | 6/2007 | Stackelhouse |
| 2007/0159354 | A1 | 7/2007 | Rosenberg |
| 2008/0088434 | A1 | 4/2008 | Frieder et al. |
| 2008/0125970 | A1 | 5/2008 | Scheckler |
| 2009/0299625 | A1 | 12/2009 | Denaro |
| 2011/0018736 | A1 | 1/2011 | Carr |
| 2011/0068949 | A1 | 3/2011 | Ieda et al. |
| 2011/0178811 | A1 | 7/2011 | Sheridan |
| 2011/0187559 | A1 | 8/2011 | Applebaum |
| 2011/0256881 | A1 | 10/2011 | Huang et al. |
| 2012/0259537 | A1 | 10/2012 | Schmidt et al. |
| 2012/0313792 | A1 | 12/2012 | Behm et al. |
| 2013/0027221 | A1 | 1/2013 | Johnson et al. |
| 2013/0090843 | A1 | 4/2013 | Funabashi |
| 2013/0105583 | A1 | 5/2013 | Peterson et al. |
| 2013/0110292 | A1 | 5/2013 | Peterson et al. |
| 2013/0110357 | A1 | 5/2013 | Peterson et al. |
| 2013/0173474 | A1 | 7/2013 | Ranganathan et al. |
| 2013/0295970 | A1 | 11/2013 | Sheshadri et al. |
| 2013/0326137 | A1 | 12/2013 | Bilange et al. |
| 2014/0121932 | A1 | 5/2014 | Zeng |
| 2014/0210643 | A1 | 7/2014 | Baker |
| 2014/0354449 | A1 | 12/2014 | Alam et al. |
| 2015/0288819 | A1 | 10/2015 | Brown et al. |
| 2016/0042767 | A1 | 2/2016 | Araya et al. |
| 2016/0063773 | A1 | 3/2016 | Hatton et al. |
| 2016/0071412 | A1 | 3/2016 | Bullock et al. |
| 2016/0071417 | A1 | 3/2016 | Lewis et al. |
| 2016/0100302 | A1 * | 4/2016 | Barash .................. G16H 40/20 455/404.2 |
| 2016/0154117 | A1 | 6/2016 | Baudia |
| 2016/0171521 | A1 * | 6/2016 | Ramirez .............. G08G 1/0112 701/409 |
| 2016/0210858 | A1 | 7/2016 | Foster et al. |
| 2017/0015239 | A1 | 1/2017 | Rao et al. |
| 2017/0098372 | A1 | 4/2017 | Eilertsen |
| 2017/0098373 | A1 | 4/2017 | Filley et al. |
| 2017/0105108 | A1 | 4/2017 | South |
| 2017/0187787 | A1 | 6/2017 | Syamala et al. |
| 2017/0192429 | A1 | 7/2017 | Tseng et al. |
| 2017/0193821 | A1 | 7/2017 | Baranga et al. |
| 2017/0219360 | A1 | 8/2017 | Cui et al. |
| 2017/0241660 | A1 | 8/2017 | Sekar et al. |
| 2017/0332347 | A1 | 11/2017 | Boss et al. |
| 2017/0353892 | A1 | 12/2017 | Elia et al. |
| 2017/0359712 | A1 | 12/2017 | Meredith et al. |
| 2017/0366930 | A1 | 12/2017 | Treman |
| 2018/0005523 | A1 | 1/2018 | Cahan et al. |
| 2018/0059669 | A1 | 3/2018 | Madigan et al. |
| 2018/0087914 | A1 | 3/2018 | Bravo et al. |
| 2018/0090000 | A1 | 3/2018 | Bravo et al. |
| 2018/0121956 | A1 | 5/2018 | Deluca et al. |
| 2018/0204447 | A1 | 7/2018 | Morgan et al. |
| 2018/0232767 | A1 | 8/2018 | Garg et al. |
| 2018/0322785 | A1 | 11/2018 | Jerichow et al. |
| 2019/0019297 | A1 | 1/2019 | Lim et al. |
| 2019/0027032 | A1 | 1/2019 | Arunachalam |
| 2019/0035269 | A1 | 1/2019 | Donovan et al. |
| 2019/0082377 | A1 | 3/2019 | Silver |
| 2019/0088106 | A1 | 3/2019 | Grundstrom |
| 2019/0088140 | A1 | 3/2019 | Sheckler et al. |
| 2019/0101930 | A1 | 4/2019 | Yadmellat |
| 2019/0220001 | A1 | 7/2019 | Lavoie et al. |

FOREIGN PATENT DOCUMENTS

| | | |
|---|---|---|
| CN | 105857277 A | 8/2016 |
| CN | 105894857 A | 8/2016 |
| DE | 102013008545 A1 | 11/2014 |
| DE | 102016005114 A1 | 2/2017 |
| EP | 2325822 A1 | 5/2011 |
| FR | 3046771 A1 | 7/2017 |
| JP | 2009198391 A | 9/2009 |
| JP | 2014201181 A | 10/2014 |
| KR | 1020160092965 A | 8/2016 |
| WO | 2006034246 A2 | 3/2006 |
| WO | 2015136958 A1 | 9/2015 |
| WO | 2017082756 A1 | 5/2017 |
| WO | 2017200754 A1 | 5/2017 |
| WO | 2017200794 A1 | 11/2017 |

OTHER PUBLICATIONS

2018 GovTech 100, Next Wave of Civic Innovation, http://www.govtech.com/100/, Jan. 22, 2018.

(56) References Cited

OTHER PUBLICATIONS

HAAS AlertR2V™ (Responder-to-Vehicle) Technology: Enabling Safer, Faster, Emergency Response, HAAS Inc., 2018.
PCT International Search Report and Written Opinion dated Aug. 27, 2018 from corresponding Application No. PCT/US18/37297, 17 pages.
International Search Report and Written Opinion; Application No. PCT/US2019/012817; dated Oct. 9, 2019.
PCT International Search Report and Written Opinion of the International Searching Authority dated Oct. 8, 2019 in corresponding Application No. PCT/US2019/021604, 15 pages.
International Search Report and Written Opinion issued in PCT/US2018/063210 dated Mar. 7, 2019.

* cited by examiner

1

SYSTEMS AND METHODS FOR REMOTE MANAGEMENT OF EMERGENCY EQUIPMENT AND PERSONNEL

TECHNICAL FIELD

This application relates to systems, equipment and methods for the remote management of emergency equipment and personnel to enhance the safety and efficiency of equipment and personnel during operations on or near working roadways and/or in the line of duty including law enforcement, emergency responders, construction personnel, and roadside service providers.

BACKGROUND

When an emergency event is reported to an emergency dispatch office, the office dispatches emergency responders to the reported location involved in the emergency event. The emergency responders can include law enforcement, fire and rescue services, construction personnel, and roadside service providers. It is not only critical to send emergency responders to the emergency scene promptly and efficiently to provide rescue efforts to the people involved in the emergency event, but it is also important to guarantee the safety of emergency responders in the line of duty. From the National Highway Traffic Safety Administration (NHTSA) collision report, there are approximately 30,000 collisions per year involving firetruck alone and over 60,000 collisions per year involving emergency responders.

Therefore, it is essential to deploy a management system that coordinates emergency equipment and personal to enhance the safety of emergency responders while keeping the efficiency of emergency rescue.

One widely used technology in current management system for emergency equipment and personal deploys a visual and audio warning system, such as emergency lights and sirens, installed on emergency equipment to alert others to the approach of the emergency responders. However, these warning messages are easily ignored by people, or go unnoticed by people with hearing impairments or by distracted drivers.

Another technology is to pre-empt traffic signals to regulate traffic flow and facilitate the movement of the emergency responders. However, this technology requires a direct line-of-sight range from the traffic signal control device to the emergency equipment to enable efficient communication and control of the system. Additionally, it is costly to install communication devices on each traffic signal to implement this technology.

There are also vehicle-to-vehicle communication technologies to alert people to the approaching of an emergency responders, which also requires line-of-sight range to trigger the alert system.

All of the above-mentioned technologies are limited by short range communication between the emergency responders and the personnel. Therefore, it is urgent to develop new or improved management system to remotely manage emergency equipment and personnel.

Furthermore, current technologies only provide transient emergency alerts to the people nearby the emergency responders. There is no current technology to systematically collect emergency data and statistically analyze the emergency data to provide information for better understanding the emergency dispatching system and improve the current management system.

Thus, a management system with the capability to systematically collect emergency data and statistically analyze emergency data can offer an opportunity to enhance safety of emergency responders and concurrently improve the efficiency of emergency rescue.

The present invention solves these and other problems in the prior art.

SUMMARY OF THE INVENTION

The disclosure presents a system for remotely managing emergency equipment through network and methods to use this system to monitor emergency equipment and deliver emergency information to direct or indirect subscribers. The system for remotely managing emergency equipment includes at least one node, also referred to as emergency equipment or personnel, a remote server, and a plurality of direct and/or indirect subscriber devices. The remote server receives data collected from each node, processes the data based on the needs of the subscribers, and sends the processed data to the direct and/or indirect subscribers to manage the emergency equipment and personnel. The system can prevent accidents, provide emergency warnings, and assist in the dispatch of emergency vehicles.

In certain embodiments, subscribers can have direct or indirect access or control over personnel or systems. Having access to current state of equipment and personnel allows subscribers an opportunity to identify current and future needs and optimizations. In other embodiments, a subscriber may require direct access to coordinate apparatus and personnel, and therefore can be granted access through separate and defined communication channels and protocols.

Disclosed is a system for remotely managing emergency equipment, comprising: at least one node, comprising: at least one sensor configured to collect node data related to the node; memory configured to store the node data; a processor configured to process the node data; and a transmitter configured to wirelessly transmit the node data; and a remote server, comprising: a receiver configured to receive the node data from the node; memory configured to store the node data; a processor configured to determine safety parameters to create a safety zone about the node based on the node data; and a transmitter to transmit the safety parameters to subscriber devices.

Disclosed is a method for remotely managing emergency equipment, comprising: receiving at a node processor node data collected from at least one node sensor; transmitting from a node transmitter the node data; receiving at a remote server processor the node data; determining at the remote server processor safety parameters to create a safety zone about the node based on the node data; and transmitting from a remote server transmitter the safety parameters.

BRIEF DESCRIPTION OF THE DRAWINGS

The present disclosure will become more readily apparent from the specific description accompanied by the drawings.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

Figure 1:
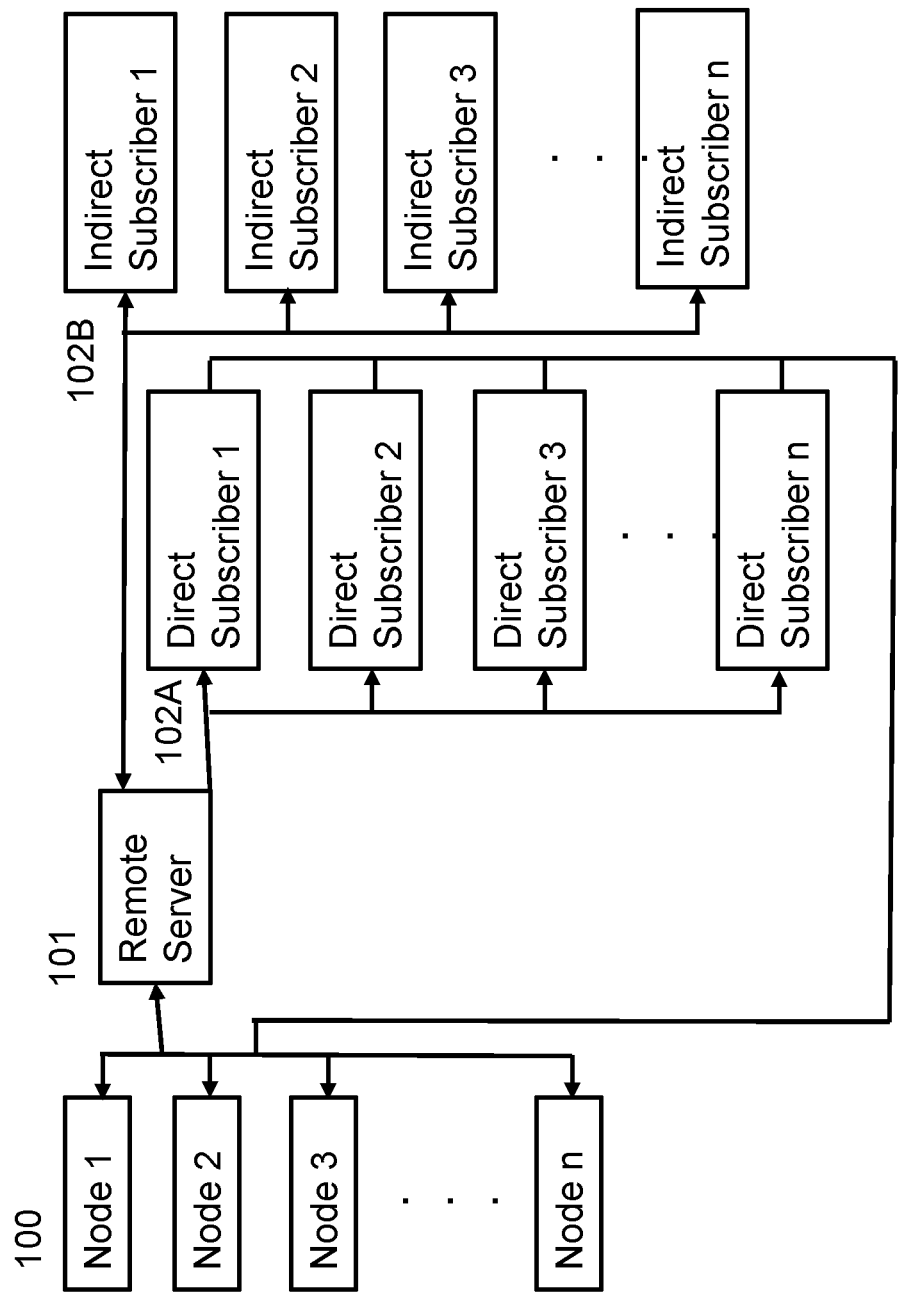
FIG. 1 is a block diagram illustrating a system and method for remote management of emergency equipment and personnel according to the present disclosure.

A system and method for remote management of emergency equipment and personnel is illustrated in FIG. 1.

The management system includes a plurality of nodes 100, a remote server 101, and a plurality of direct subscriber devices 102A and/or indirect subscriber devices 102B.

The nodes 100 can be installed in an emergency vehicle, a wearable or portable device, and/or an emergency assistance device. Nodes 100 can include a variety of sensors, including accelerometers, GPS receivers, impact sensors, temperature sensors, motion sensors, etc.; other sensors are contemplated.

The remote server 101 can reside on a network infrastructure or on a third-party service provider, such as a cloud storage and computing system. Generally, the remote server 101 can include a processor, memory, a transmitter, and a receiver. The transmitter and receiver can be configured to receive any mode of wireless communications, including, but not limited to, radio frequency (RF), cellular bands, wifi bands, etc.

The direct subscriber devices 102A are compatible with and can directly communicate with the nodes 100. Some examples of direct subscriber devices 102A are emergency vehicle communication systems, emergency vehicle siren and light systems, etc.

The indirect subscriber devices 102B can be a computer system, a mobile device, a digital indicator, or another digital system. The indirect subscriber devices 102B typically do not directly communicate with the nodes 100, and might be installed for government, management, and regulatory agencies such as Traffic Control, Federal Emergency Management Agency (FEMA), Original Equipment Manufacturer (OEM), and/or City Planner. Other indirect subscriber devices 102B can include traffic lights, sirens and/or lights on an emergency vehicle, portable or vehicle-mounted navigation systems, other portable devices including cellphones, etc; other devices are contemplated.

The remote server 101 receives data collected from the nodes 100, stores the data, analyzes the data, and sends the analyzed data to the nodes 100, the direct subscriber devices 102A and/or the indirect subscriber devices 102B. The remote server 101 analizes the data to generate safety parameters to create a safety zone about the node based on the node data. The safety zone can be a safety perimeter created around the node. The size of the safety perimeter is created based on the type of node and the sensor data received from the node. For example, a node that represents an emergency vehicle that is stopped along side a road can have a safety zone created large enough to encompass the vehicle and an estimated additional area where an emergency responder might be expected to be when outside the vehicle. In addition, the safety zone can be created to move along with the vehicle or other node (e.g., a wearable node on an emergency responder).

The safety zone can be measured in units from feet to miles depending on the requirements of the emergency. For example, a police cruiser stopped on the side of the road might have 2 nodes, one for the police cruiser and another for the police officer. Node data from each node is transmitted to the remote server 101 and analyzed by the remote server processor. The remote server processor can determine a safety zone for each node or combine the nodes to create an all-encompassing safety zone about the officer and cruiser.

The safety zone created can be based on these or other factors such as type of emergency, number of nodes involved in the emergency situation, sensor data from the nodes. etc. For example, a stationary node representing a maintenance vehicle sitting on a road side might only require a safety zone of a few yards, whereas a moving node in a police cruiser might require a ¼ mile safety zone radius to provide a safe operating zone for the officer.

The analysis can be real-time analysis and/or a delayed analysis for larger data sets. For more complex or real time requirements, data subsets may be transmitted back to the node for further real time processing, or the node may perform its own real time processing and return that processed data to the server for distribution and analysis.

The data collected from the nodes 100 can be emergency activating status of the node, a type of the node, location data of the node, and working status of the node. In addition, data can include the operator of the vehicle, identified by the wearable device, direction and velocity of a vehicle, data concerning the operator of the vehicle, whether inside or outside the vehicle, including biometrics, the horizontal or vertical orientation of the personnel, potentially used to issue an "Officer Down" alert, etc. Other data is contemplated. The data communication among the nodes 100, the remote server 101, and the direct/indirect subscriber devices 102 can be based on a wired and/or wireless network, which includes a mobile network, a wireless local area network (WLAN), a wireless sensor network, a satellite communication network, a terrestrial microwave network, Internet, etc.

The node data can also include data related to the type of the node to identify that the node is an emergency responder or a type of vehicle (e.g., a police cruiser, a fire truck, and ambulance, a maintenance truck, etc.). Based on this information, the safety zones required to maintain the safety of the personnel can be configured and maintained throughout the emergency situation.

The direct/indirect subscriber device 102A/102B receives the delivered data from the remote serve 101 to notify the subscribers about an occurrence of an emergency event. The management system can communicate the data among the node, the remote server, and/or the subscribers to prevent accidents, provide emergency warnings, and assist in the dispatch of emergency vehicles. The subscriber device 102A/102B can be programmed to receive the safety parameters and output a visual and/or audible warning signal when the subscriber device nears and/or enters the safety zone. The subscriber device 102A/102B can also be programmed to receive the safety parameters and output a visual "do not enter" area that visualizes the safety zone created about the node.

Figure 6:
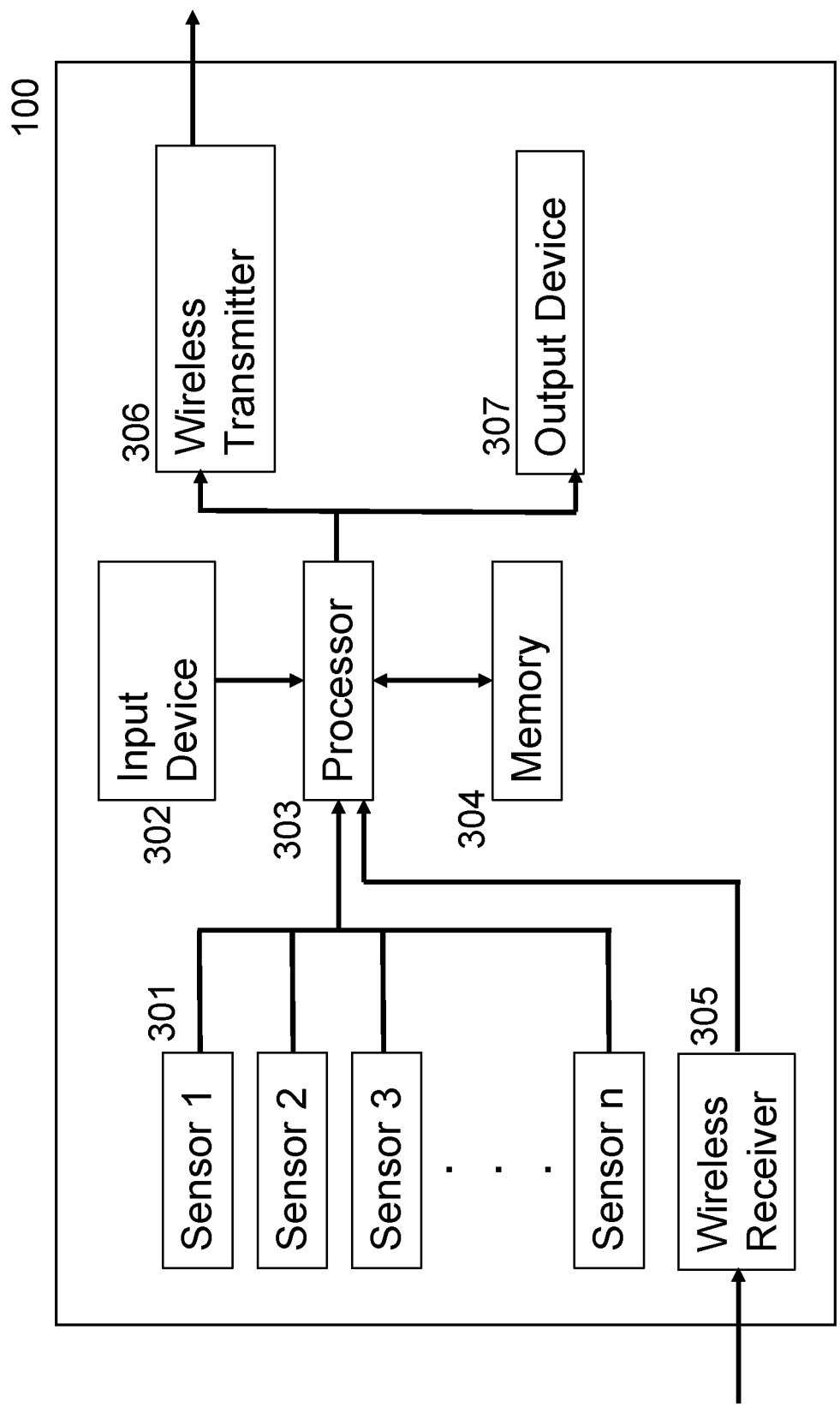
FIG. 6 is a block diagram illustrating a node of a system and method for remote management of emergency equipment and personnel according to the present disclosure.

A representative illustration of a node of the system and method for remote management of emergency equipment and personnel is illustrated in FIG. 6. The node 100 can be a vehicle or other device equipped with advanced electronic systems to coordinate with the functionality of the node 100 and wirelessly communicate with other devices/systems. Each node 100 includes at least one sensor 301, a processor 303, a memory 304, and a wireless transmitter 306, and can include an input device 302, a wireless receiver 305, and an output device 307.

The node sensor 301 monitors the working status of the node 100 and collects various data from the node 100. The node sensor 301 can include, but is not limited to, a global positioning system (GPS), infrared light sensors, radar, laser radar, cameras, accelerometers, gyroscopes, velocity sensors, thermometers, air quality sensors, hygrometers, piezoelectric pressure sensors, and magnetometers. The node sensor 301 periodically collects data related to the working status of the node 100 and send the data to the node processor 303, for example, personnel biometric data and orientation. The system can also use data from systems of one or more vehicles, communicated today via a bus, e.g. Controller Area Network (CAN) Bus.

The node processor 303 processes the data collected from the node sensor 301 and stores the data in the node memory 304. The node processor 303 can also be installed with executable program instructions to determine the occurrence of an emergency event based on functionality criterion. Once an emergency event is confirmed, the node processor 303 sends the data collected from the node sensor 301 to a remote server 101 through the node transmitter 306.

In one embodiment, the node processor 303 is installed with executable program instructions to send stored data collected from the node sensor 301 to the remote server 101 via the node wireless transmitter 306 on a regular basis, which can be used for maintenance purpose or for other statistical analysis purpose. Depending on time constraints or functions, the data can be transmitted as individual data packets or as a bulk transmission of queued data.

A node input device 302 enables the user to interact with the node 100. The node input device 302 may be a keyboard, a touch screen, an audio input system, a voice recognition system, CAN Bus data commands, touch screen with tactile feedback overlay, etc. The user can use node input device 302 to send queries and/or commands to the node processor 303 to execute program instructions for data collection, process, and transmission.

A node output device 307 presents information to the user. The node output device 307 might be a screen, a speaker, a light, a siren, a visual system, an audio system, in vehicle heads up display (HUD), an array of LEDs arranged and colored in such a way to indicate direction and proximity of approaching vehicle(s), etc. The node output device 307 can present the current working status of the node, alert an emergency status of the node and show the data communication status with other devices and/or systems.

The node transmitter 306 wirelessly communicates with the remote server 101 via a wireless network. As stated above, wired communications can be implemented in situations where a wired network can be implemented. The wireless network can be a mobile network, a wireless local area network (WLAN), a wireless sensor network, a satellite communication network, a terrestrial microwave network and/or Internet.

The node wireless receiver 305 receives data wirelessly transmitted from other compatible devices and/or systems. The node wireless receiver 305 receives data and sends the data to the node processor 303 for data process. The node processor 303 might also presents the received data on the node output device 307 to the user.

In one embodiment, the node 100 is equipped with a black box control system to control the radio, public address (PA) system, video system and/or audio system of the node. The black box control system includes a hardware system, an Application Programming Interface (API), and program instructions. The hardware system is a main system network controller of control modules installed in each node. The control modules include but not limited to one or more of siren module, Wifi module, Bluetooth, Ethernet, input module, and output module. The API provides interface for devices or system to interact with the hardware system. The hardware system installed with the program instructions to receive messages/signals from other devices/system, to synchronize the video system and/or audio system of the node with other devices/system, to output the messages/signals to the node output device 307, to transmit synchronization messages/signals to other devices/system. The black box control system can synchronize the node configuration, such as flash light pattern and/or siren pattern, map the node location and/or movement, and identify hardware of each node. The black box control system utilizes both local area network (LAN) and wide area network (WAN) to communicate with other devices/systems.

In another embodiment, the node 100 is equipped with a first responder device connectable with other devices or systems. The first responder connectable device includes a hardware system and program instruction. The hardware system may include at least one of Global Position System (GPS) module, GPS antenna, Wifi module, cellular module, and encryption module. The program instructions include programs to enable user interaction with the hardware system, to manage user accounts, and to communicate with black box control systems and other first responder connectable devices. During over-the-road operation, when the node approaches a road intersection, the first responder connectible device detects the road intersection and trigger node siren tones and/or flash light pattern through the black box control systems to alert passengers around. In this case, the first responder connectible device can also locate the node positions over time and transmit the node location data to other devices/systems. During over-the-air operation, the first responder connectable device mainly supports and maintains the communication path between the first responder device and the black box control system through real time data exchange such as data downloading from and data uploading to a remote server. In this case, the first responder device can download data from the remote server to upgrade the black box control system and deploy the updates. The first responder device can also upload diagnostic data from the black box control system to the remote server and troubleshoot operation problems occurred in the black box control system.

The node 100 may be labeled with a radio-frequency identifier (RFID) or other electronically readable identifier to enable identification of each node in wireless communication and data management. Nodes can also be uniquely identified by use of a small electronic component, e.g., a silicon serial number. In addition, nodes can be user programmable for unique and quick identification.

Figure 7:
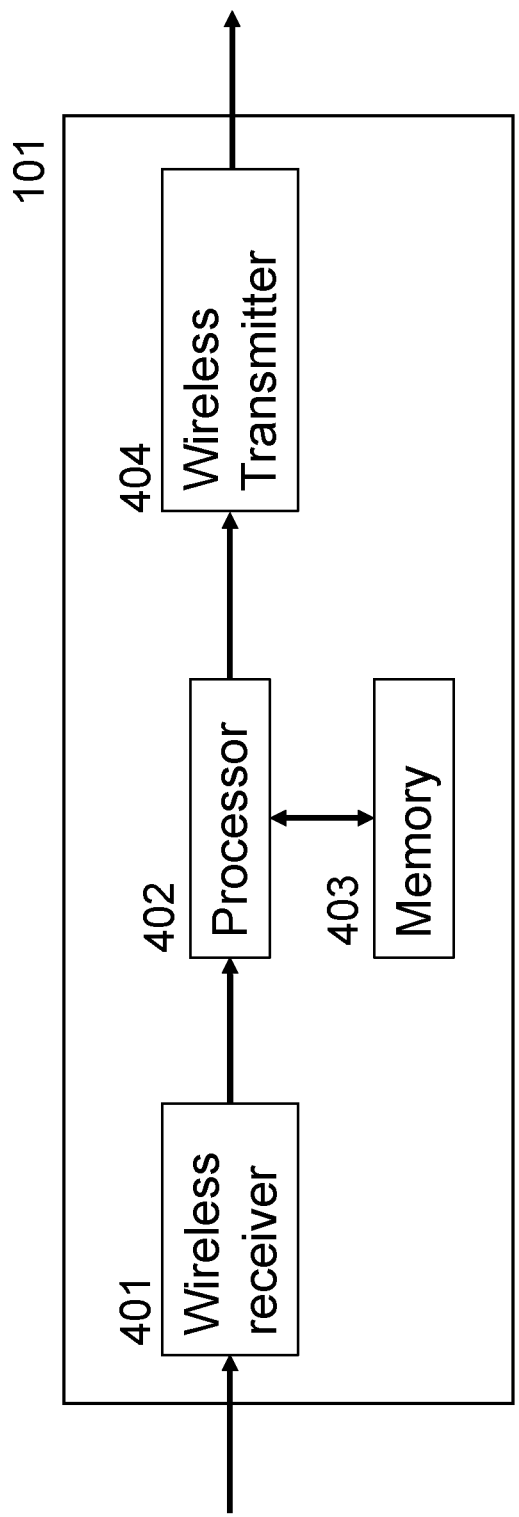
FIG. 7 is a block diagram illustrating a remote server of a system and method for remote management of emergency equipment and personnel according to the present disclosure.

A representative remote server of the system and method for remote management of emergency equipment and personnel is illustrated in FIG. 7. The remote server 101 can reside on a network infrastructure or on a third-party service provider, such as a cloud storage and computing system. The remote server 101 can include a wireless receiver 401, a processor 402, a memory 403, and a wireless transmitter 404. The remote server wireless receiver 401 receives data transmitted from the node 100 and sends the data to the remote server processor 402. As stated above, wired communications are applicable in situations where a wired network can be implemented. The remote server processor 402 processes the data and stores the data in the remote server memory 403. The remote server processor 402 analyzes the data transmitted from the node 100 and further transmits the data via the remote server wireless transmitter 404 to other devices and/or systems.

Figure 8:
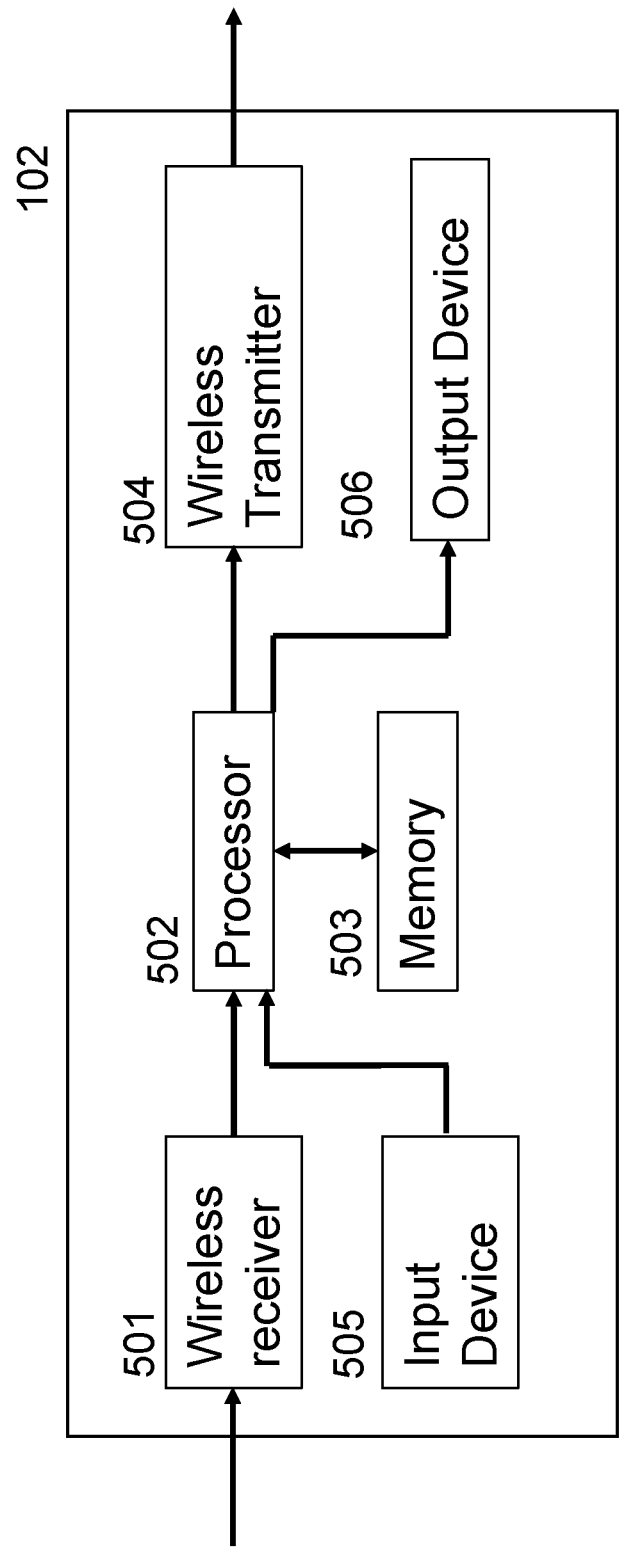
FIG. 8 is a block diagram illustrating a subscriber device of a system and method for remote management of emergency equipment and personnel according to the present disclosure.

A representative subscriber device of the system and method for remote management of emergency equipment and personnel is illustrated in FIG. 8. The subscriber device 102 can be a computer system, a mobile device, a digital indicator or a digital alert system. The subscriber device 102 includes a wireless receiver 501, a processor 502, a memory 503, and an output device 506, and can also include an input device 505, and a wireless transmitter 504.

The subscriber device wireless receiver 501 receives data transmitted from the remote server 101 and sends the data to the subscriber device processor 502. As stated above, wired communications are applicable in situations where a wired network can be implemented. The subscriber device processor 502 processes the data and stores the data in the subscriber device memory 503. The subscriber interacts with the subscriber device through a subscriber device input device 505. The subscriber device input device 505 can be a keyboard, a touch screen, an audio input system or a voice recognition system. A subscriber device output device 506 presents information to the subscriber such us the data transmitted from the node 100, alert message generated from the subscriber device processor 502, and current working status of the subscriber device. The subscriber device output device 506 might be a screen, a speaker, a light, a siren, a visual system, or an audio system. The subscriber device processor 502 can also transmits data to other device and/or system via the subscriber device wireless transmitter 504.

The subscriber devices 102 include at least one direct subscriber device 102A and/or indirect subscriber device 102B. The direct subscriber devices 102A are compatible with and can communicate with the nodes 100, and can be installed in an emergency vehicle, a wearable or portable device, or an emergency assistance device. In one embodiment, the direct subscriber device 102A is equipped with a black box control system to control the radio, public address (PA) system, video system and/or audio system of the direct subscriber device. The direct subscriber device 102A receives the node data transmitted from the remote server 101 and update its database stored in the direct subscriber device memory 503 by adding the node data. Based on the updated database, the direct subscriber device 102A directly communicates with the nodes 100 to synchronize the direct subscriber device configuration, such as flash pattern and/or siren tone, with the nodes 100, map the direct subscriber device location and/or movement, and identify hardware of each direct subscriber device. In another embodiment, the direct subscriber device 102A is equipped with a first responder device connectable with other devices or systems. The first responder device can sense the distance from the direct subscriber device 102A to a traffic control system such as traffic light at an intersection. Once the direct subscriber device 102A approaches the traffic control system, the first responder device triggers a black box control system installed in the direct subscriber device to change the siren tones and/or flash pattern to alert passengers around. The first responder device can also diagnose and updates the direct subscriber device working status and provides upgrade and troubleshooting to the direct subscriber device 102A through data exchange with other devices/systems. The direct communication between the direct subscriber device 102A and the node 100 is based on both local area network (LAN) and wide area network (WAN).

The indirect subscriber device 102B can be a computer system, a mobile device, a digital indicator, or a digital alter system. The indirect subscriber devices 102B are typically do not directly communicate with the nodes 100, and might be installed for government, management, and regulatory agencies such as Traffic Control, Federal Emergency Management Agency (FEMA), Original Equipment Manufacturer (OEM), and/or City Planner. The indirect subscriber device 102B submit data query to the remote server 100. The data query may be the node location data, the node emergency activation status, the node working status, and the availability of the node. The remote server 100 receives the data query and stores the data query in the remote server memory 403. Once the remote server 101 receives the node data, the remote server 101 processes the node data and extracts data matching to the data query from the indirect subscriber device 102B. The matching data is transmitted to the indirect subscriber device 102B from the remote server transmitter 404. The indirect subscriber device 102B receives the matching data from the remote server 101 and processes the data for further applications such as management of emergency equipment, coordination of emergency response dispatch, maintenance of emergency equipment, and plan of emergency response strategy.

As described above, another type of indirect subscriber device 102B can include consumer devices such as cell phones, navigation systems, and the like. These devices can be programmed to receive the safety parameters and output sounds or displays to warn the user of an upcoming safety zone.

In one embodiment, the system and method for the remote management of emergency equipment and personnel can be implemented in an incident of terrorism. During an emergency terrorist situation, emergency personnel and equipment will be dispatched to the scene. The first responders will set up a perimeter using traffic cones/barricades and vehicles; each being a node in the system. The nodes 100 generate data and send the data to the remote server 101. The data may include location of the node, identification of the node, and working status of the node. The remote server 101 receives the node data. In one example, the remote server 101 superimposes the node location on map data in the remote server memory 403 and can push the superimposed data to the subscribers. As implied, more than one node can be used to generate the safety parameters and generate a safety zone based on more than one node data. The safety zone can be displayed for the user. The remote server 101 can utilize the node data to coordinate traffic control system, such as traffic light control, to facilitate the movement of the node in line of duty. The remote server 101 can also share the map data with direct/indirect subscriber devices 102 to alert the incident of terrorism at a specific location.

The direct subscriber devices may be emergency vehicles or first responder wearable/portable devices. The direct subscriber device 102A receives the node data from the remote server and updates its database, such as map data, to locate the node positioned in the emergency event. Direct subscriber device 102A can directly communicate with the node to coordinate the emergency management, such as quarantine the incident of terrorism area from public area.

The indirect subscriber device 102B may be a computer system installed for government or regulatory agencies such as FEMA, which can automatically dispatch medical service, fire and rescue service, and law enforcement coordinately to assist the nodes, the direct subscribers and improve the safety of the first emergency responders and enhance the efficiency of the emergency rescue.

In another embodiment, the system and method are for remote management of emergency equipment and personal can be implemented in a hurricane rescue. During an emergency terrorist situation, emergency personnel and equipment will be dispatched to the scene. The first responders will set up a perimeter using traffic cones/barricades and vehicles; each being a node in the system. The nodes 100 generate data and send the data to the remote server 101. The data may include location of the node, identification of the node, and working status of the node. The remote server 101 receives the node data. In one example, the remote server 101 superimposes the node location on map data in the remote server memory 403 and can push the superimposed data to the subscribers. The remote server 101 can utilize the node data to coordinate traffic control system, such as traffic light control, to facilitate the movement of the node in line of duty. The remote server 101 can also share the map data with direct/indirect subscriber devices 102 to alert the incident of terrorism at a specific location.

The direct subscriber devices may be emergency vehicles or first responder wearable/portable devices. The direct subscriber device 102A receives the node data from the remote server and updates its database, such as map data, to locate the node positioned in the emergency event. Direct subscriber device 102A can directly communicate with the node to coordinate the emergency management, such as quarantine the incident of terrorism area from public area.

The indirect subscriber device 102B may be a computer system installed for government or regulatory agencies such as FEMA, which can automatically dispatch medical service, fire and rescue service, and law enforcement coordinately to assist the nodes, the direct subscribers and improve the safety of the first emergency responders and enhance the efficiency of the emergency rescue.

Figure 2:
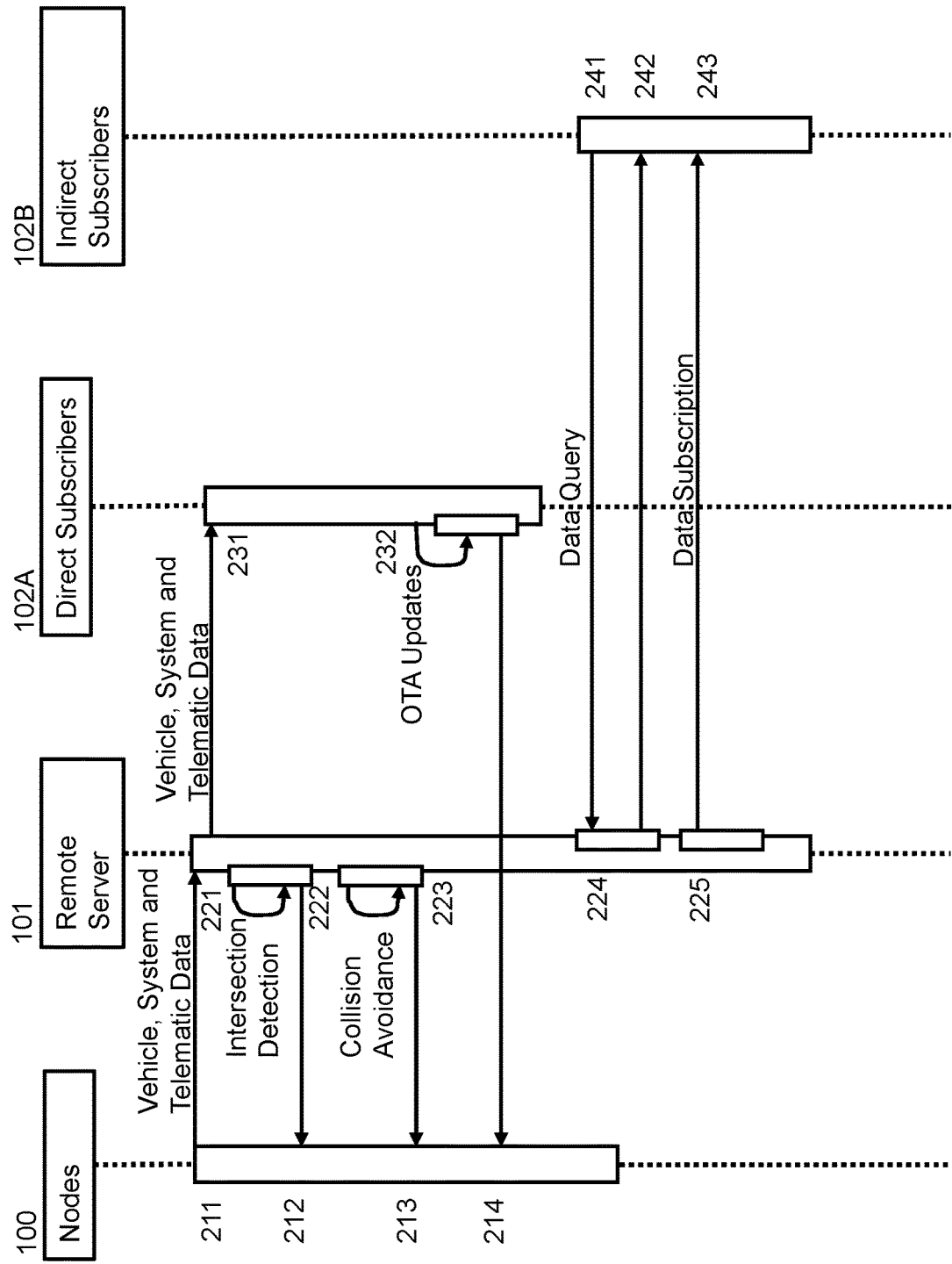
FIG. 2 is a system flow diagram illustrating a system and method for remote management of emergency equipment and personnel according to the present disclosure.

The detailed data flow in the system and method for remote management of emergency equipment and personal is illustrated in FIG. 2. The remote management system includes a plurality of nodes 100, a remote server 101, and a plurality of direct subscriber devices 102A and/or indirect subscriber devices 102B. The node 100 is equipped with advanced electronic systems to coordinate with the functionality of the node, collect data from the node and wirelessly, or wired, communicate with other devices/systems. The remote server 101 receives data from the node 100 and processes the data for further transmitting the data to the node 100 or to the subscriber devices 102. The subscriber devices 102 can be a direct subscriber device 102A, which is compatible and directly communicable with the node 100, or an indirect subscriber device 102B, which is not compatible and directly communicable with the node 100. The data flow in the remote management system includes three main paths: (1) the data flow between the node 100 and the remote server 101; (2) the data flow from the node 100 to the remote server 101 to the direct subscriber device 102A to the node 100; and (3) the data flow among the node 100, the remote server 101, and the indirect subscriber device 102B.

All data flow paths start from data transmission from the node 100 to the remote server 101. The electronic system of the node 100 monitors the working status of the node and collects data from the node. The data collected from the node can be emergency activating status of the node, type of the node, location data of the node, and working status of the node. The data collected from the node might also include telematic data generated from the node processor 303. The collected vehicle, system and telematic data from the node is processed by the node processor 303 and stored in the node memory 304. The node processor 303 wirelessly transmits the vehicle, system, and telematic data 211 via the node wireless transmitter 306 to the remote server 101. The remote sever 101 resides on a network infrastructure or on a third-party service provider, such as a cloud storage and computing system. The wireless communication of data is through a wireless network, which includes a mobile network, a wireless local area network (WLAN), a wireless sensor network, a satellite communication network, a terrestrial microwave network, and Internet.

In one aspect, the electronic system monitors the working status of the node and periodically transmits collected data from the node 100 to the remote server 101.

In another aspect, the electronic system monitors the working status of the node and only transmits data collected from the node 100 to the remote server 101 when an emergency event occurs and is confirmed by the node processor 303.

Figure 3:
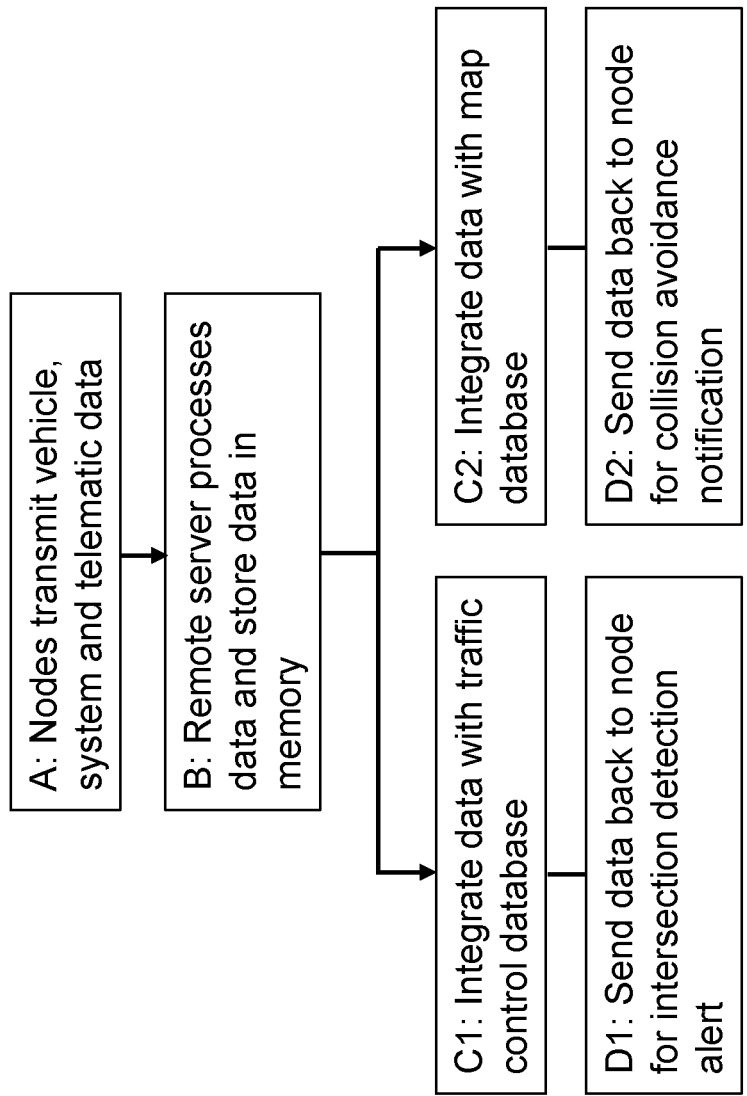
FIG. 3 is a flow chart of a system and method for remote management of emergency equipment and personnel between node and remote server according to the present disclosure.

In path one, the data flow of the management system and method is mainly between the node 100 and the remote controller 101 as illustrated in FIG. 3. The nodes 100 transmits vehicle, system and telematic data 211 to the remote server 101 in Step A. Once the remote server 101 receives the transmitted data from the node 100, the remote server stores the data 221 in the remote server memory 403 in Step B. The remote server 101 also analyzes the transmitted data from the node and superimposes the transmitted data from the node on database already stored in the remote server memory 403 in Step C. The database might be map database and/or traffic control database. For example, the location data of the node can be integrated with a traffic control database 222 to regulate traffic light signals at the intersection to pre-empt main traffic flow for facilitating the movement of the node and improving the safety of the node during travelling (Step C1). In another example, the location data of the node might be superimposed on a map database 223 to generate a warning message on the map to alert other users having access to the same map database and avoid other users colliding with the node (Step C2). The information of the updated database will be shared with the node 100 for intersection detection alert or for collision avoidance notification in Step D. Should latency issue between device nodes, communication channels, server response, and/or processing time need to be addressed, subset(s) of data can be returned to the node for more real time calculation and processing.

In one embodiment, after the transmitted data from the node is processed by the remote server 101, a message is send back to the corresponding node 100, which sent in emergency event triggered data. The message is used to check the status of the end user of the node to determine the emergency condition, to check the availability of the emergency responders, or to control the end user hardware for an emergency operation, such as emergency shutdown.

Figure 4:
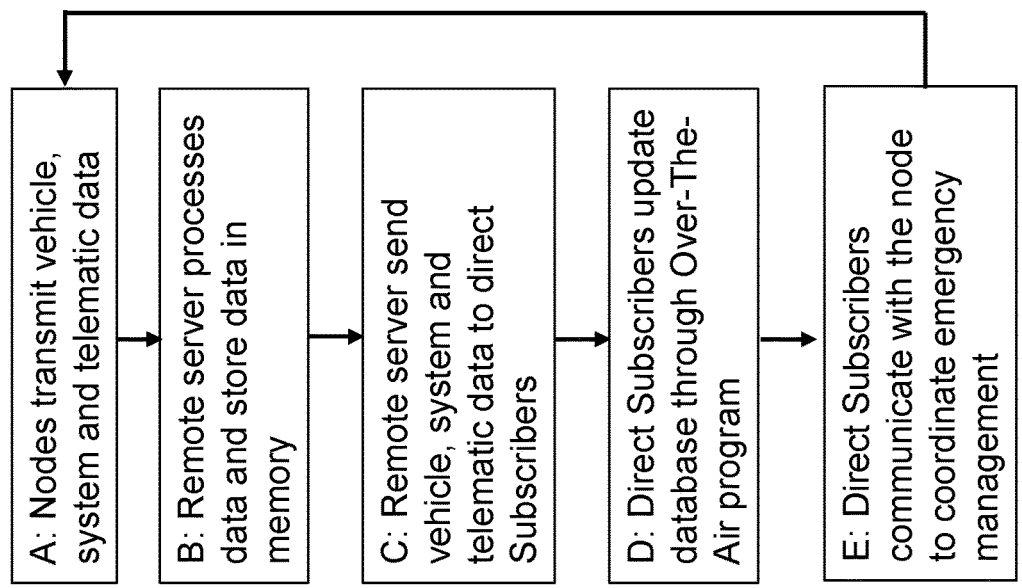
FIG. 4 is a flow chart of a system and method for remote management of emergency equipment and personnel among node, remote server and direct subscribers according to the present disclosure.

In path two, the data flow of the management system and method is among the node 100, the remote controller 101 and the direct subscriber device 102A as illustrated in FIG. 4. The node 100 transmits vehicle, system and telematic data 211 to the remote server 101 in Step A. Once the remote server 101 receives the transmitted data from the node 100, the remote server stores the data 221 in the remote server memory 403 in Step B. The remote server 101 processes the stored data 221 and further transmits the vehicle, system and telematic data to direct subscriber device 102A in Step C. The direct subscriber device 102A receives the transmitted data from the remote server 101 and stores the data 231 in the subscriber device memory 503. The direct subscriber device is compatible and directly communicable with the end user hardware, or the node, in the management system and method. The direct subscriber device 102A also updates its database 232 using the data transmitted from the remote server 101 by over-the-air programming (OTA) in Step D. The database of the direct subscriber device can be a map database(s) or a traffic control database(s). The OTA/fleet management operations can be isolated from the data and analytic database(s). The direct subscriber device 102A can directly communicate with the node 100 and share the updated database 232 with the node 100 to coordinate the management of emergency equipment and personal in Step E.

In one embodiment, when an emergency event is determined in the node 100, emergency event triggered data 211 are transmitted to the remote server 101, and then the remote server 101 transmits an emergency warning message 221 to the direct subscriber device 102A by Over-The-Air (OTA) programming to real time update the database 232 stored in the direct subscriber memory 503. The warning message 221 might be shown on the subscriber device output device 506 to notify the subscriber about the occurrence of an emergency event. The subscriber device output device 506 can be a visual system or an audio system. The direct subscriber device 102A can also communicate directly with the node 100, which sent out the emergency event triggered data 211 to the remote server 101. The direct subscriber device 102A shares the updated database 232 with the node 100 sent out the emergency data 211 to facilitate emergency response strategy planning. For example, the nearby direct subscriber can directly communicate with the node sent out the emergency data to promptly assist the end user involved in the emergency event.

In another embodiment, the node 100 transmits vehicle, system and telematic data 211 to the remote server 101 on a regular basis. The remote server 101 processes the data 211 transmitted from the node 100 and generates a report data 221. The remote server 101 shares the report data 221 with the direct subscriber device 102A. The direct subscriber device 102A updates its database 232 of the direct subscriber device with addition of the report data 221. The updated database 232 might be shown on the subscriber device output device 506 to inform the subscriber about the statistics of the emergency equipment during a certain period. The direct subscriber device 102A can also communicate directly with the node 100, which sent out the data 211 to the remote server 101. The direct subscriber device 102A shares the updated database 232 with the node 100 sent out the data 211 for system maintenance purpose.

Figure 5:
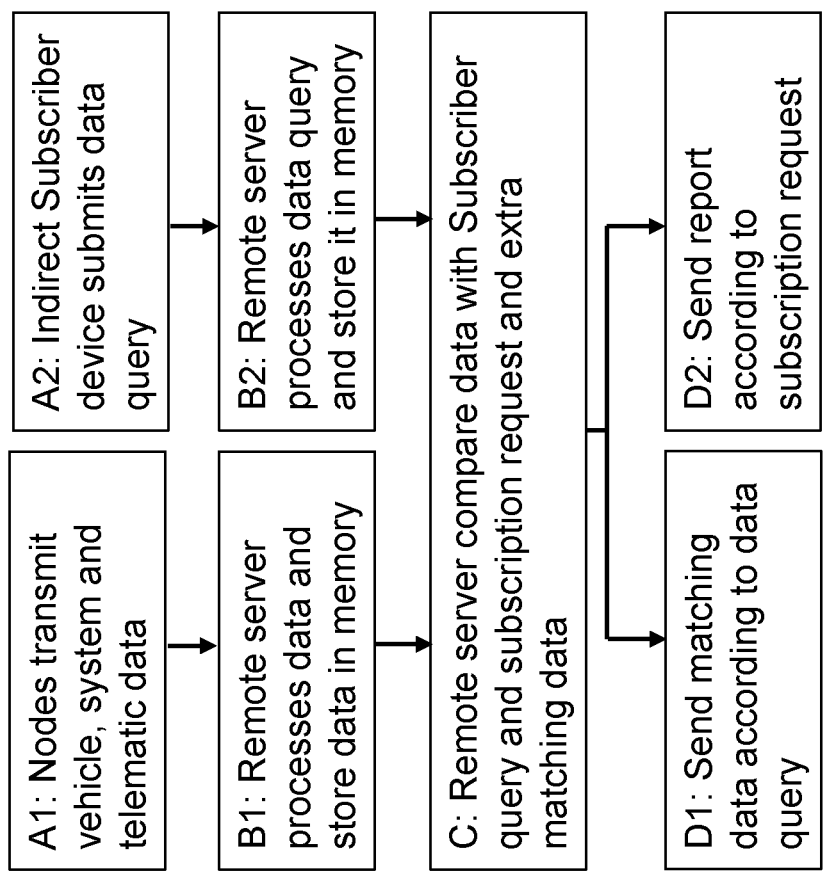
FIG. 5 is a flow chart of a system and method for remote management of emergency equipment and personnel among node, remote server, and indirect subscribers according to the present disclosure.

In path three, the data flow of the management system and method is among the node 100, the remote controller 101 and the indirect subscriber device 102B as illustrated in FIG. 5. The nodes 100 transmits vehicle, system and telematic data 211 to the remote server 101 in Step μl. Once the remote server 101 receives the transmitted data from the node 100, the remote server stores the data 221 in the remote server memory 403 in Step B1. The indirect subscriber device is not compatible and directly communicable with the end user hardware, or the node, in the management system and method. The indirect subscriber device 102B submits data query 241 to the remote server 101. The remote server 101 stores the transmitted data query 241 in the remote server memory 403 in Step B2. The remote server processor 402 executes program instructions to extract matching data from the data 221 transmitted from the node 100 and stored in the remote server memory 403 based on the data query 241 transmitted from the indirect subscriber device in Step C. The extracted matching data 224 is send to the indirect subscriber device 102B in Step D. The indirect subscriber device 102B receives the extracted matching data 224 from the remote server 101 and stores the data 242 in the subscriber device memory 503 and/or presents the data 242 on the subscriber device output device 506.

In one embodiment, the remote server 101 sends vehicle, system and telematic data to the indirect subscriber device 102B upon data query from the indirect subscriber device. The indirect subscriber device 102B submits data query information 241 to the remote server 101. After the remote server 101 receives the data query 241 submitted from the indirect subscriber device 102B, the remote server 101 stores the data query 241 in the remote server memory 403. The remote server 101 compares the vehicle, system and telematic data 221 transmitted from the node 100 and stored in the remote server memory 403 with the data query 241 submitted from the indirect subscriber device 102B and stored in the remote server memory 403 to extract matching data 224. For example, if the indirect subscriber device 102B requests the location of the node 100, a copy of location data of the node will be extracted from the data 221 stored in the remote server memory 403. A copy of the matching data 224 is transmitted to the indirect subscriber device 102B to fulfill the data query request. The data query 241 can be a real time update of change of condition of the node 100 or a specific working status of the node 100. If the data 221 stored in the remote server memory 403 do not match with the data query 241 submitted by the indirect subscriber device 102B, then a "no matching" message 224 will be delivered to the indirect subscriber device 102B to notify the subscriber about the result. The indirect subscriber device 102B receives the matching data or the "no matching" message 224 from the remote server 101 and stores the data in the subscriber device memory 503. The subscriber device processor 502 processes the data and presents the processed data 242 on the subscriber device output device 506. The subscriber device output device 506 can be a visual system or an audio system.

In another embodiment, the remote server 101 sends vehicle, system and telematic data to the indirect subscriber device 102B based on the registration information submitted from the indirect subscriber device 102B during subscription service registration. The indirect subscriber device 102B is registered to the remote management system for subscription service. The indirect subscriber device 102B submits data request information to the remote server 101 during registration. The data request can be updating a real time change of condition of the node 100 or reporting working status of the node 100 periodically. After the remote server 101 receives the data request submitted from the indirect subscriber device 102B, the remote server 101 stores the data request in the remote server memory 403. The remote server 101 compares the vehicle, system and telematic data 221 transmitted from the node 100 and stored in the remote server memory 403 with the data request submitted from the indirect subscriber 102B and stored in the remote server memory 403 to extract matching data 225. For example, if the indirect subscriber device 102B requests the change of the location of the node 100, a copy of location data of the node will be extracted from the data 221 stored in the remote server memory 403. A copy of the extracted matching data 225 is transmitted to the indirect subscriber device 102B to provide the subscription service. If the data 221 stored in the remote server memory 403 do not match with the data request submitted by the indirect subscriber device 102B, then no data delivery occurs at this point. The indirect subscriber device receives the matching data 225 and stores the data in the subscriber device memory 503. The subscriber device processor 502 processes the data and presents the processed data 243 on the subscriber device output device 506. The subscriber device output device 506 can be a visual system or an audio system.

The data request submitted by the indirect subscriber device 102B during registration to the subscription service include emergency alters on condition change of the node and/or a summary of the working status of the node status during certain period.

Where this application has listed the steps of a method or procedure in a specific order, it may be possible, or even expedient in certain circumstances, to change the order in which some steps are performed, skip certain steps if quicker operation is programmed, and it is intended that the particular steps of the method or procedure claim set forth here below not be construed as being order-specific unless such order specificity is expressly stated in the claim.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A system for remotely managing emergency equipment, comprising:
   at least one node, comprising:
      at least one sensor configured to collect node data related to the node;
      memory configured to store the node data;
      a processor configured to process the node data; and
      a transmitter configured to wirelessly transmit the node data; and
   a remote server, comprising:
      a receiver configured to receive the node data from the node;
      memory configured to store the node data;
      a processor configured to determine safety parameters to create a safety zone about the node based on the node data; and
      a transmitter to transmit the safety parameters to subscriber devices.

2. The system for remotely managing emergency equipment of claim 1, wherein the node data includes at least one of location data, speed data, acceleration data.

3. The system for remotely managing emergency equipment of claim 1, wherein the sensors include at least one of an accelerometer, a GPS receiver, and an impact sensor.

4. The system for remotely managing emergency equipment of claim 1, wherein the subscriber devices include at least one of a traffic light, a siren or light positioned on an emergency vehicle, and a hand-held or vehicle mounted navigation device.

5. The system for remotely managing emergency equipment of claim 1, wherein the safety zone is created about a group of more than one node.

6. The system for remotely managing emergency equipment of claim 1, wherein the node further comprises a receiver to receive data from the remote server.

7. A system for remotely managing emergency equipment, comprising:
   at least one subscriber device comprising:
      a receiver for receiving safety parameters generated by a remote server based on sensor data generated by at least one remote node, the safety parameters creating a safety zone about the node;
      a processor for generating at least one of an audio alert and video alert based on the safety parameters; and
      at least one of a display and a speaker for outputting the alert.

8. A system for remotely managing emergency equipment, comprising:
   a plurality of nodes, each node comprising:
      at least one sensor configured to collect node data;
      memory configured to store the node data;
      a processor configured to process the node data; and
      a transmitter configured to wirelessly transmit the node data;
   a remote server, comprising:
      a receiver configured to receive the node data from each node;
      memory configured to store the node data;
      a processor configured to determine safety parameters to create a safety zone about the node based on the node data; and
      a transmitter configured to transmit the safety parameters to subscriber devices; and
   at least one subscriber device, comprising:
      a receiver configured to wirelessly receive the safety parameters;
      memory configured to store the safety parameters;

a processor configured to process the safety parameters and generate an alert; and an output device to output the alert.

9. The system of claim 8, wherein the node is a vehicle or a wearable device.

10. The system of claim 8, wherein the sensor is at least one of global positioning system (GPS), infrared light sensors, radar, laser radar, cameras, accelerometers, gyroscopes, velocity sensors, thermometers, air quality sensors, hygrometers, piezoelectric pressure sensors, and magnetometers.

11. The system of claim 8, wherein the data comprises emergency activating status of the node, type of the node, location data of the node, and working status of the node.

12. The system of claim 8, wherein the subscriber device is a computer system or a mobile device.

13. The system of claim 8, wherein the node further comprises:

an input device configured to enable user interaction with the node, wherein the input device is at least one of a keyboard, a touch screen, an audio input system or a voice recognition system; and an output device configured to present information to the user, wherein the output device is at least one of a display, a light, a siren, a speaker, a visual system or an audio system.

14. The system of claim 8, wherein the transmission of data and reception of data is based on a network including at least one of a mobile network, a wireless local area network (WLAN), a wireless sensor network, a satellite communication network, a terrestrial microwave network, and Internet.

15. A method for remotely managing emergency equipment, comprising:

receiving at a node processor node data collected from at least one node sensor;

transmitting from a node transmitter the node data; receiving at a remote server processor the node data;

determining at the remote server processor safety parameters to create a safety zone about the node based on the node data; and transmitting from a remote server transmitter the safety parameters.

16. The method of claim 15, further comprising:

receiving the safety parameters by a subscriber device receiver of a subscriber device;

generating an alert by a subscriber device processor based on the safety parameters; and outputting the alert by a subscriber device output device.

17. The method of claim 15, wherein the node data comprises emergency activating status of the node, type of the node, location data of the node, and working status of the node.

18. The method of claim 15, wherein the node sensor is at least one of global positioning system (GPS), infrared light sensors, radar, laser radar, cameras, accelerometers, gyroscopes, velocity sensors, thermometers, air quality sensors, hygrometers, piezoelectric pressure sensors, and magnetometers.

19. The method of claim 15, wherein the step of determining at the remote server processor safety parameters to create a safety zone about the node based on the node data, comprises:

identifying a type of emergency event;

identifying a number of nodes involved in the emergency event;

identifying a type of each node;

creating the safety zone based on the type of emergency event, the number of nodes, and type of nodes.

* * * * *